US007909243B2

(12) United States Patent
Merkow et al.

(10) Patent No.: US 7,909,243 B2
(45) Date of Patent: Mar. 22, 2011

(54) SYSTEM AND METHOD FOR COMPLETING A SECURE FINANCIAL TRANSACTION USING A WIRELESS COMMUNICATIONS DEVICE

(75) Inventors: Mark Merkow, Tempe, AZ (US); James Petrone, Carefree, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 627 days.

(21) Appl. No.: 11/862,686

(22) Filed: Sep. 27, 2007

(65) Prior Publication Data
US 2009/0057393 A1 Mar. 5, 2009

Related U.S. Application Data

(60) Provisional application No. 60/968,393, filed on Aug. 28, 2007.

(51) Int. Cl.
*G06Q 40/00* (2006.01)
*G06Q 20/00* (2006.01)
*G07D 11/00* (2006.01)
*G07F 19/00* (2006.01)
*G06K 5/00* (2006.01)
*G06K 7/00* (2006.01)
*G06K 7/10* (2006.01)

(52) U.S. Cl. .................... 235/379; 235/462.01; 235/380; 235/435; 705/41; 705/67

(58) Field of Classification Search .................. 235/379, 235/380, 462.01, 487, 435; 705/26, 27, 35, 705/64, 41, 67
See application file for complete search history.

(56) References Cited

U.S. PATENT DOCUMENTS

| 5,883,810 | A | * | 3/1999 | Franklin et al. | 700/232 |
|---|---|---|---|---|---|
| 6,685,093 | B2 | * | 2/2004 | Challa et al. | 235/462.46 |
| 7,658,324 | B2 | * | 2/2010 | Gindele | 235/380 |
| 2001/0032192 | A1 | * | 10/2001 | Putta et al. | 705/76 |
| 2001/0034717 | A1 | * | 10/2001 | Whitworth | 705/64 |
| 2001/0051924 | A1 | * | 12/2001 | Uberti | 705/44 |
| 2002/0023027 | A1 | * | 2/2002 | Simonds | 705/26 |
| 2002/0120583 | A1 | * | 8/2002 | Keresman et al. | 705/65 |
| 2002/0169720 | A1 | * | 11/2002 | Wilson et al. | 705/44 |
| 2002/0178088 | A1 | * | 11/2002 | Lurie et al. | 705/26 |
| 2004/0006512 | A1 | * | 1/2004 | Rebsamen | 705/16 |
| 2004/0143527 | A1 | * | 7/2004 | Benkert et al. | 705/35 |
| 2006/0180664 | A1 | * | 8/2006 | Barrett et al. | 235/383 |
| 2006/0242036 | A1 | * | 10/2006 | Walker et al. | 705/34 |

(Continued)

OTHER PUBLICATIONS

International Search Report and Written Opinion, issued Jun. 29, 2009, in International Application No. PCT/US 08/74461.

*Primary Examiner* — Daniel Walsh
(74) *Attorney, Agent, or Firm* — Snell & Wilmer L.L.P.

(57) ABSTRACT

A system and method for completing a financial transaction using a wireless communication device is provided. A transaction authorization request is sent from the device to an issuer using SMS. An authentication message is sent from the issuer to the device, and a response is sent by a user of the device to confirm the identity of the user. Once the identity of the user is verified, a surrogate account number, in a bar code format, is sent to the mobile communication device to be read by a POS device to complete the financial transaction. A computer program product enabling the systems and methods described is also provided.

16 Claims, 5 Drawing Sheets

U.S. PATENT DOCUMENTS

| | | |
|---|---|---|
| 2006/0278698 A1* | 12/2006 | Lovett .......................... 235/380 |
| 2007/0005445 A1* | 1/2007 | Casper .......................... 705/26 |
| 2007/0021969 A1* | 1/2007 | Homeier-Beals ................ 705/1 |
| 2007/0083444 A1* | 4/2007 | Matthews et al. .............. 705/30 |
| 2007/0194123 A1* | 8/2007 | Frantz et al. ............. 235/462.45 |
| 2008/0052164 A1* | 2/2008 | Abifaker ...................... 705/14 |
| 2008/0059341 A1* | 3/2008 | Narayanaswami et al. ..... 705/28 |
| 2008/0120195 A1* | 5/2008 | Shakkarwar .................. 705/26 |
| 2008/0201265 A1* | 8/2008 | Hewton ......................... 705/67 |
| 2008/0210754 A1* | 9/2008 | Lovett .......................... 235/380 |
| 2009/0094125 A1* | 4/2009 | Killian et al. .................. 705/17 |
| 2009/0114716 A1* | 5/2009 | Ramachandran ............. 235/379 |
| 2009/0173781 A1* | 7/2009 | Ramachandran ............. 235/379 |
| 2009/0182634 A1* | 7/2009 | Park et al. ..................... 705/14 |
| 2009/0204530 A1* | 8/2009 | Hanson ......................... 705/35 |
| 2010/0133334 A1* | 6/2010 | Vadhri ......................... 235/379 |
| 2010/0138347 A1* | 6/2010 | Chen ............................. 705/44 |

* cited by examiner

SYSTEM AND METHOD FOR COMPLETING A SECURE FINANCIAL TRANSACTION USING A WIRELESS COMMUNICATIONS DEVICE

CROSS-REFERENCE TO RELATED APPLICATIONS

This application claims the benefit of U.S. Provisional Patent Application No. 60/968,393, filed Aug. 28, 2007, the entire disclosure of which is herein incorporated by reference.

BACKGROUND OF THE INVENTION

1. Field of the Invention

The present invention generally relates to a system and a method for completing a financial transaction using a wireless communication device. In particular, the present invention relates to wirelessly receiving a numeric message or bar code on a wireless communication device from an issuer representing a surrogate account number for one-time use by a merchant to process a point-of-sale or point-of-service (collectively "POS") purchase. A computer program product allowing implementation of the system and method is also provided.

2. Related Art

Consumers often use financial transaction instruments as convenient forms of payment for purchases of goods and/or services ("goods/services") instead of using cash or checks. Traditionally, a financial transaction instrument is embodied as a card-shaped device, also referred to herein as a "card," and may be any of the following: a traditional "plastic" transaction card (e.g., a credit card, a charge card, a debit card, a pre-paid or stored-value card, or the like); a titanium-containing, or other metal-containing, transaction card; a clear or translucent transaction card; a foldable or otherwise unconventionally-sized transaction card; or any other type of card used in connection with a financial transaction.

It is common for financial transaction instruments to be shaped as cards that fit in a wallet, to make them convenient for consumers to carry one or more when traveling or performing day-to-day activities outside their homes. Many consumers regularly carry several such cards at a time, with each card corresponding to a different financial transaction account. This sometimes causes a great deal of inconvenience, especially when each of the several cards must be searched in order to find a particular card to be used for a financial transaction (e.g., when a merchant only accepts an American Express® card for the transaction). Also, when a consumer carries several cards at a time, the consumer may misplace or lose one of the cards and not become aware of the missing card until the next time the card is to be used, which may not be for days or weeks or longer. If it turns out that the missing card was stolen and then used for fraudulent purchases, both the card issuer and the consumer can suffer monetary losses. Therefore, there is a need for a convenient way for consumers to make purchases that does not require the use of a card.

More recently, new types of financial transaction instruments, configured with electronic functionality, have become popular. Electronic circuitry is printed on or otherwise incorporated within these instruments for implementing financial transactions. One such instrument is a contactless transaction card, sometimes referred to as a "smart card." Contactless transaction cards may be equipped with electronic circuitry for wirelessly communicating data to and/or reading data from a card reader/writer, which reads data from or transfers data to such transaction cards. The wireless communication of data may occur via an electromagnetic transmission or other type of wireless transmission. Contactless transactions cards, however, present inconveniences and drawbacks similar to those of other cards, as discussed above. Another such instrument is a fob-type device shaped to dangle from a keychain, in which a wireless transponder and reader are incorporated in the device. Fob-type devices, however, tend to be bulky. Therefore, if a consumer carries several such devices on a keychain, it may be uncomfortable and/or unsightly for the consumer to keep the keychain in a clothing pocket, or it may require the consumer to use a larger handbag than otherwise would be necessary. Of course, if the several fob-devices are carried around loosely rather than on a single keychain, then a similar drawback occurs as with cards. That is, a consumer may not become aware of a misplaced or lost device until the next time the device is to be used, which may not be for days or weeks or longer, and which may cause economic losses for the consumer and/or the device issuer if it turns out that the missing device was stolen and then used for fraudulent purchases. Therefore, there is a need for a convenient way for consumers to make purchases that does not require the use of a fob-type device.

As used herein, a "financial transaction account," also referred to herein as a "transaction account," may be a bank account, a credit account, or the like. For example, a bank account may be a savings account, a checking account, a money-market account, or the like; and a credit account may be a transaction account associated with a pre-approved line of credit.

Also, as used herein, the term "merchant" refers to any person, entity, distributor system, software, and/or hardware that is a provider or broker of goods/services, and includes any other entity in the distribution chain of goods/services. For example, a typical merchant may be a grocery store, a retail store, a travel agency, a service provider, a public-service utility, a school, a library, an on-line merchant, a government agency, or the like.

Also, as used herein, the terms "consumers," "customers," and "users" may be used interchangeably to refer to persons who purchase goods/services from merchants.

In regard to use of a financial transaction account, a consumer may communicate or interact with a traditional merchant in person (e.g., at a store), telephonically, or electronically (e.g., from a computer via the Internet). During the interaction, the merchant may offer good/services to the customer. The merchant also may offer the customer an option to pay for the goods/services using any number of available transaction accounts via their corresponding financial transaction instruments.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as the following: a telephone network; an intranet; the global, public Internet; a point of interaction device (e.g., a point of sale (POS) device, personal digital assistant (PDA), mobile phone, kiosk, etc.); online communications; off-line communications; wireless communications; and/or the like.

An "account," "account number," or "account code", as used herein, may include any device, code, number, letter, symbol, digital certificate, smart chip, digital signal, analog signal, biometric, or other identifier/indicia suitably configured to allow a consumer to access, interact with, or communicate with a financial transaction system. The account number may optionally be located on or associated with any financial transaction instrument (e.g., a rewards, charge, credit, debit, prepaid, telephone, embossed, smart, magnetic stripe, bar code, transponder, or radio frequency card).

The account number may be distributed and stored in any form of plastic, electronic, magnetic, radio frequency (RF), wireless, audio, and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$$N_1N_2N_3N_4\ N_5N_6N_7N_8\ N_9N_{10}N_{11}N_{12}\ N_{13}N_{14}N_{15}N_{16}$$

The first five to seven digits are reserved for processing purposes and identify the issuing institution, card type, and so on. In this example, the last (sixteenth) digit is typically used as a sum check for the sixteen-digit number. The intermediary eight-to-ten digits are used to uniquely identify the customer, cardholder, or card member.

For credit cards, the account number is generally displayed on the face of the cards. The expiry date is also oftentimes shown on the face of a card. Card verification value codes ("CVV") or card verification numbers generally are printed on the back of credit cards to reduce fraudulent use of these account numbers. However, these card verification numbers are also visible.

As used herein, "surrogate account number" represents a number generated by the issuer for a particular a financial transaction. The surrogate account number contains the information necessary to complete a financial transaction, such as a POS purchase, and can include information identifying, for example, the account, account holder name, issuer, acquiring bank, and expiry date. Information contained in the surrogate account number can also relate to information conventionally stored in the magnetic strip of a credit card, for example, country codes, discretionary data, longitudinal redundancy checks, separators, format codes, currency, type, check digit, etc.

Generally, a traditional merchant that wants to provide customers with the option to pay for goods/services with a particular type of financial transaction instrument will enter into an agreement with the issuer of that type of instrument (e.g., American Express®, Visa®, Discover®, MasterCard®, or the like). The issuer typically is a financial organization or institution (e.g., American Express®, JPMorgan Chase, MBNA®, Citibank®, or the like).

As used herein, "issuer" can also represent a financial institution that provides the financial transaction instrument to an individual, also referred to herein as an "account holder." Oftentimes, the "account holders" are the same as the "consumers," "customers" or "users" referred to above. The issuer can also be an "acquirer," which can be a financial institution that provides card processing services.

Although financial transaction instruments (e.g., cards and fob-type devices) provide consumers with a convenient way to pay for purchases and also provide traditional merchants with a convenient way to obtain payment for purchases, a user still needs to carry around a physical financial transaction instrument; as such, there is oftentimes a risk of theft and fraud.

Given the foregoing, a need exists for a system that conveniently enables consumers to make a purchase that does not require the use of a card or a fob-type device. Furthermore, there is a need for a system that enables a person to securely completely a financial transaction without exposing the user's actual account number to the public eye reducing the risk of theft and fraud.

BRIEF DESCRIPTION OF THE INVENTION

The present invention meets the above-identified need by providing a system, a method, and a computer program product that allows a buyer to complete a purchase without a card or fob-type device.

An advantage of the present invention is that it allows a merchant to use hardware and software that is already in use, minimizing costs to implement the invention.

Another advantage of the present invention is that an account holder does not need to carry around a financial transaction instrument, such as a credit card or fob-type device and only needs to have with him/her a mobile communications device. Because there is no physical financial transaction instrument, there is reduced risk of theft of account information.

Another advantage of the present invention is that because a unique surrogate account number and associated bar code can be generated for each transaction at the explicit instruction of a user and expires after the transaction is complete or after a predetermined amount of time, there is even smaller risk of theft and fraud of information relating to the financial transaction instrument.

Another advantage of the present invention is that because risks of theft and fraud are reduced, merchant charge backs can be reduced and customer service calls for suspicious charges on a statement can be reduced. Furthermore, the overall payment card industry can benefit when effective anti-fraud measures are implemented.

Another advantage of the present invention is that users can have a greater sense of security using credit cards in the market place and online.

Yet another advantage of the present invention is that while RFID tags have become increasingly popular, bar codes are still much less expensive to implement that the RFID.

According to an example embodiment of the present invention, a computer program product comprising a computer-usable medium having control logic stored therein for causing a computer to enable a buyer to make a purchase using a mobile communication device is provided. The control logic comprises first computer-readable program code for causing the computer to receive a purchase request transmitted from the mobile communication device of the buyer; second computer-readable program code for causing the computer to respond to the purchase request by requesting information relating to an identity of the buyer; and third computer-readable program code for causing the computer to receive a response to the information request; fourth computer-readable program code for causing the computer to determine whether the information requested and the response received match; and fifth computer-readable program code for causing the computer to send a surrogate account number to enable the buyer to complete the purchase, wherein the surrogate account number is encoded in a bar code.

In accordance with another example embodiment of the present invention, a computer system comprising a processor and a memory storing control logic for causing the processor to enable a buyer to make a purchase using a mobile communication device is provided. The control logic includes first computer-readable program code for causing the computer to receive a purchase request transmitted from the mobile communication device of the buyer; second computer-readable program code for causing the computer to respond to the purchase request by requesting information relating to an identity of the buyer; third computer-readable program code for causing the computer to receive a response to the information request; fourth computer-readable program code for causing the computer to determine whether the information requested and the response received match; and fifth computer-readable program code for causing the computer to send a surrogate account number to enable the buyer to complete the purchase, wherein the surrogate account number is encoded in a bar code.

According to another example embodiment of the present invention, a method for a buyer to purchase a product or service is provided. The method comprises sending a transaction authorization request to an issuer from a mobile communications device; receiving an authentication message; sending a response to the authentication message; and receiving a machine-readable image, such as a bar code, containing information relating to an account associated with the buyer to process the purchase.

According to yet another example embodiment of the present invention, a method for a buyer to purchase a product or service is provided. The method comprises sending a transaction authorization request to an issuer from a mobile communications device; receiving an authentication message; sending a response to the authentication message; and receiving an SMS containing information relating to an account associated with the buyer to complete the purchase; converting said SMS into a machine-readable image.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a system and a method for enabling a person to receive a one-time credit card number for completing a financial transaction, which can be used in conjunction with pre-existing point-of-sale or point-of-service ("POS") devices. Since implementation of the present invention can eliminate the need for carrying a physical credit card, these one-time credit card numbers are also referred to herein as "surrogate account numbers."

The present invention can use preexisting equipment of a merchant, but provides added security and decreased risk of fraud compared to that of prior art instruments and methods.

II. System

Figure 1:
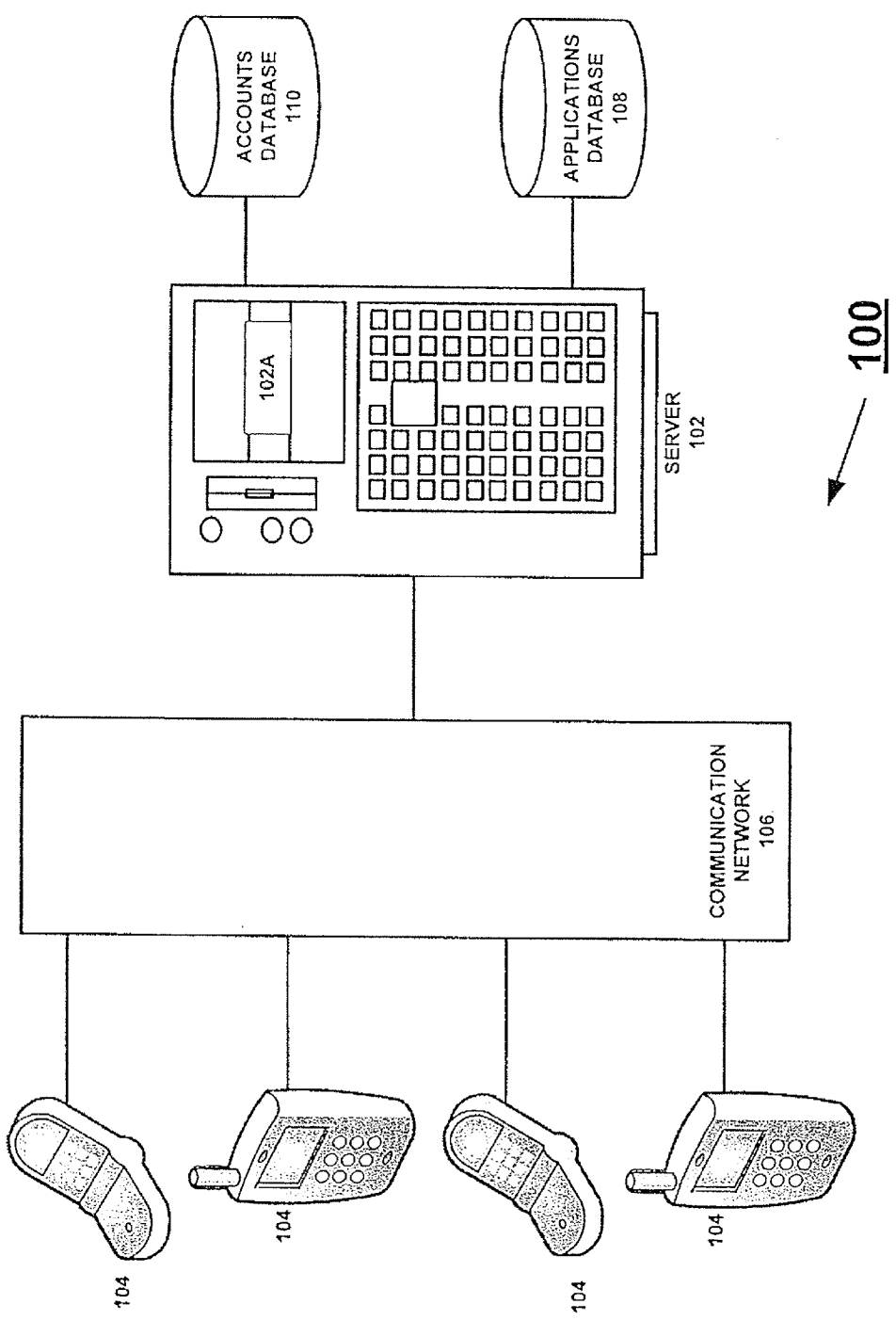
FIG. 1 is a schematic system diagram of an exemplary wireless barcode financial transaction system used to implement an embodiment of the present invention.

FIG. 1 shows a schematic system diagram of an exemplary wireless barcode financial transaction system 100, used to implement or practice one or more embodiments of the present invention. Wireless barcode financial transaction system 100 includes a server 102 that is able to communicate with a plurality of mobile devices 104 via a communication network 106.

Server 102 has access to a plurality of databases in/from which information is stored/retrieved, such as an applications database 108 and an accounts database 110, for example. Applications database 108 stores one or more applications that can be uploaded to (or downloaded by) mobile device 104 via a wireless transmission using communication network 106. Accounts database 110 stores information on transaction accounts. Server 102 includes a Web hosting environment 102A, whose function is described in more detail below.

In an embodiment of the present invention, server 102 is managed by an issuer (e.g., American Express®), and accounts database 110 stores information on transaction accounts of that issuer.

Communication network 106 may be a cellular communication network, a satellite communication network, the Internet, or any other means of wireless communication between server 102 and mobile device 104, and between different mobile devices 104. Mobile device 104 may be a mobile telephone, a personal digital assistant (e.g., a Blackberry®), a portable computer, or any other digital device able to perform wireless data communication with server 102 or with another mobile device 104.

Mobile device 104 may be equipped with Bluetooth®, NFC ("near-field communication"), and/or infrared (e.g., IrDA) communication modules, which enables it to communicate wirelessly with other devices in its proximity or in its line of sight.

Optionally, to ensure security, communications may occur indirectly with server 102 through a security filter (not shown) such as, for example, a firewall, which may be implemented with hardware, software, or a combination thereof. Other types of security measures may be employed, as will be appreciated by persons of skill in the relevant art(s).

According to an embodiment, applications database 108 includes applications created according to the J2ME platform established by Java®. For mobile devices 104 that are mobile telephones, the J2ME applications can be downloaded by (or uploaded to) the mobile telephones using known ".jad" and ".jar" technology.

Figure 2:
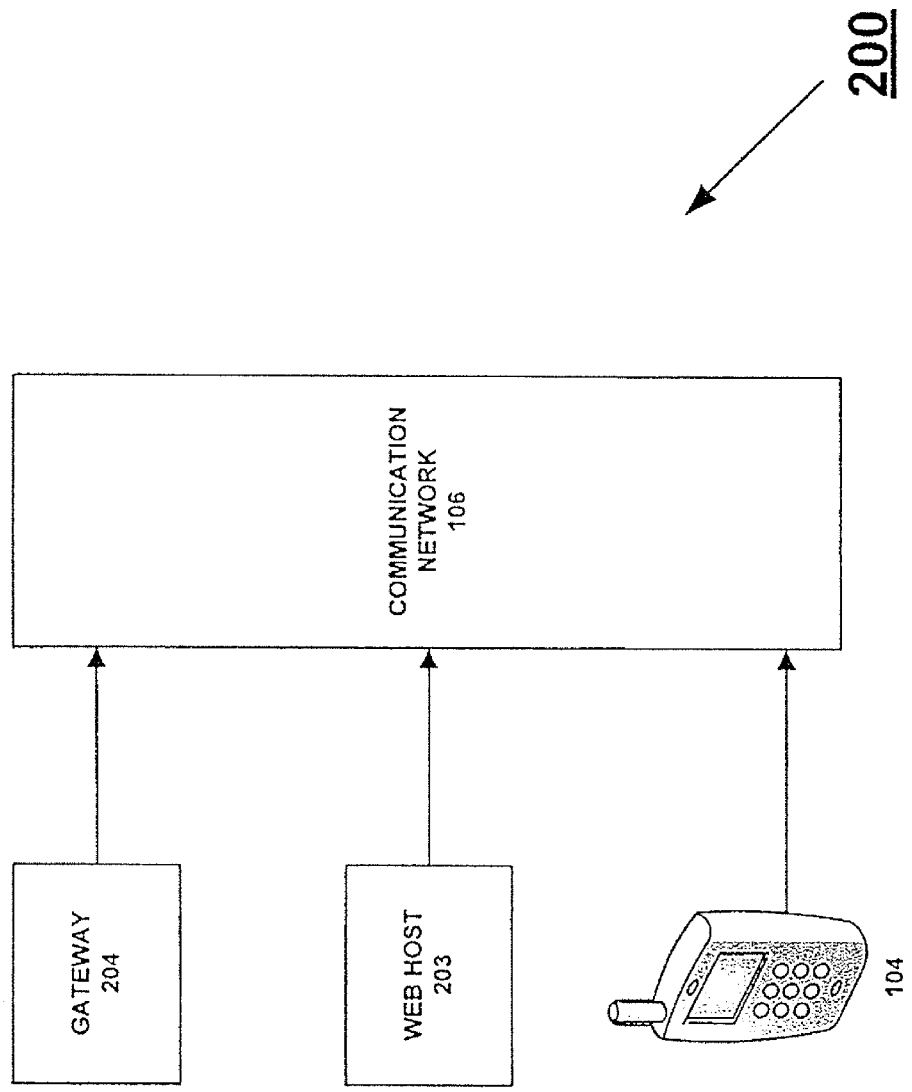
FIG. 2 is a schematic system diagram of an exemplary application-installation system used to implement an embodiment of the present invention.

FIG. 2 shows a schematic system diagram for an application-installation system 200, which may be used to install an application or applet on mobile device 104. The application or applet may be used to practice one or more embodiments of the present invention.

Application-installation system 200 includes mobile device 104, Web host 203, and a gateway 204. Web host 203 may be Web hosting environment 102A of server 102, shown in FIG. 1, or may be an apparatus separate from server 102.

During installation of the application, gateway 204 sends a message to mobile device 104. The message may be sent using, for example, known push technology. The message includes a URL for a .jad file and requests a user of mobile device 104 to confirm that download of the payment application is desired. After the message is received by mobile device 104, the user confirms that download is desired by sending a reply to the message. The message and the reply may be, for example, SMS messages. The reply causes Web host 203 to use the URL to retrieve the .jad file, which then is sent to mobile device 104. The .jad file includes a URL for a .jar file.

As will be appreciated by persons skilled in the relevant art(s), a .jad file is a descriptor file for a .jar file. Because .jar files can be large, the purpose of the .jad file is to enable mobile device 104 to download a small .jad file initially, which contains detailed information on the content of the corresponding .jar file. The detailed information may include, for example, the source of the .jar file, the size of the .jar file, etc.

Mobile device 104 reads and executes the .jad file, which causes Web host 203 to download the .jar file to mobile device 104 based on the URL for the .jar filed included in .jad file. After the .jar file has been downloaded to the mobile device 104, the user is asked to confirm that download of the payment application is desired. When the user responds affirmatively to the request, Web host 203 retrieves the application (e.g., from a database of applications) and causes the application to download to mobile device 104.

IV. Exemplary Applications of the System

The following are examples of various ways wireless barcode financial transaction system 100 may be utilized.

In an embodiment of the present invention, wireless barcode financial transaction payment system 100 includes a processor and a memory storing control logic for causing the processor to receive a purchase request transmitted from the mobile communication device of the buyer, to the purchase request by requesting information relating to an identity of the buyer, to receive a response to the information request, to determine whether the information requested and the response received match, and to send a surrogate account number to enable the buyer to complete the purchase, wherein the surrogate account number is encoded in a bar code.

According to an aspect of the embodiment, the purchase request is transmitted from the buyer's mobile communication device using SMS.

Figure 3:
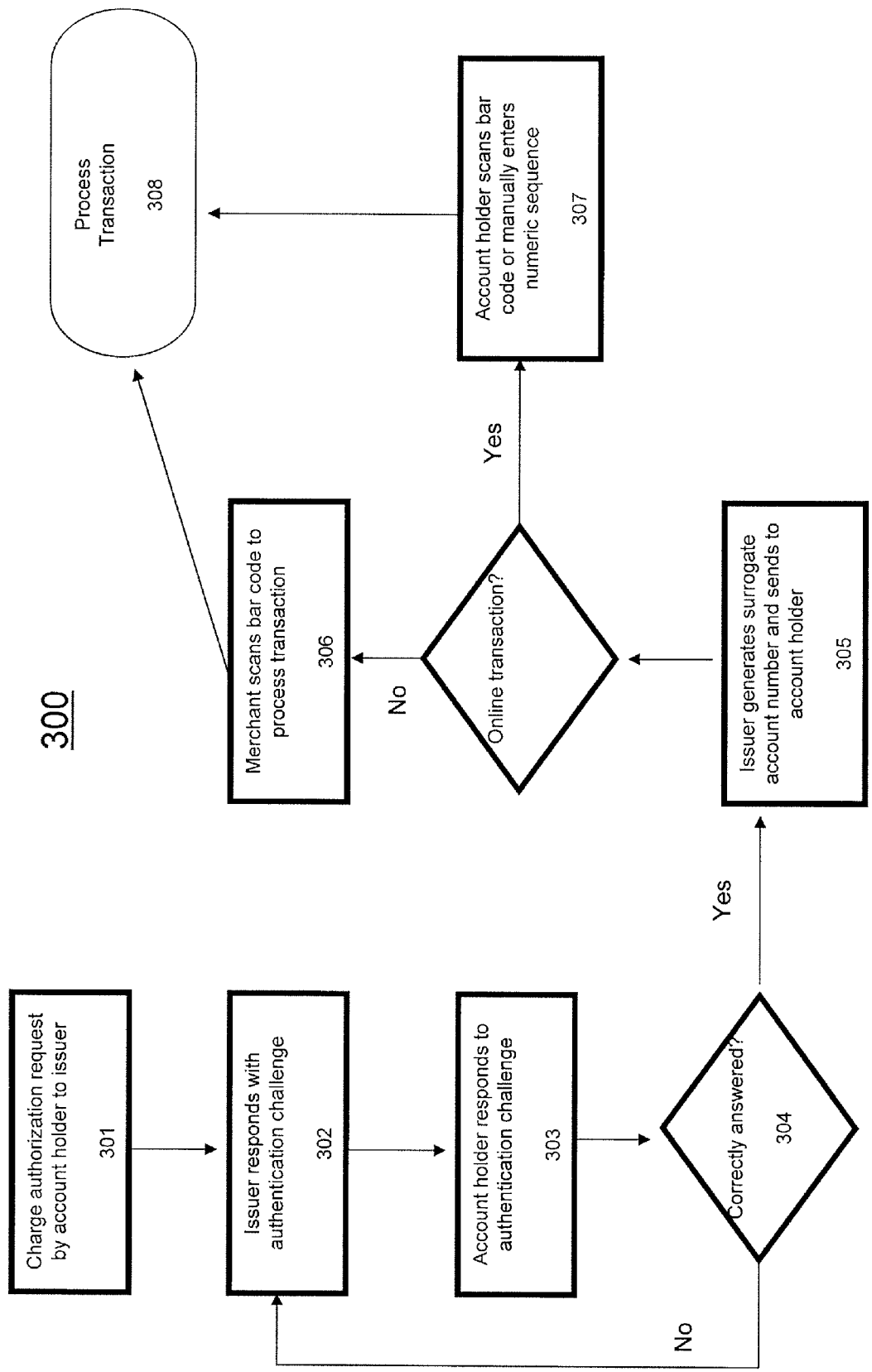
FIG. 3 shows a flowchart illustrating an exemplary process, according to an embodiment of the present invention.

According to yet another aspect of the embodiment, the purchase request is transmitted by an application stored in the buyer's mobile communication device III. Process Referring to FIG. 3, a flowchart illustrating a purchase process 300, according to an embodiment of the present invention, is shown. Preferably, process 300 utilizes system 100. As discussed above, optional security measures (e.g., firewall, etc.) may be implemented prior to and/or concurrently with communication with server 102.

Process 300 begins when an account holder or buyer initiates a charge authorization request to an issuer in step 301. This request may be made, for example, by sending a message from the mobile communications device by Short Message Service (SMS). Other wireless methods, such as Multimedia Messaging Service, may be employed for sending the request. Other applications or applets may be installed or downloaded onto the mobile communications device to provide an interface for the user to communicate with the issuer.

In an example embodiment of the present invention, a message using SMS can be sent to a designated phone number for a particular account. For example, if a user has multiple accounts with the same issuer, e.g., American Express® Green, Gold, Platinum, Blue, etc., the user can choose which account he or she wants to use by sending a message to a unique phone number designated for that account. An application or applet can also be provided on the user's mobile communication device to facilitate selection of the desired account.

Initiation of a charge authorization request can be done in ways other than SMS messaging, so long as the issuer is notified that the account holder wishes to make a transaction. For example, the buyer could call the phone number associated with the account. Furthermore, the purchase request can be transmitted from an application in the buyer's mobile communication device.

At step 302, the issuer responds to the charge authorization request to confirm the account holder's identity. This can be done, for example, by asking an identity question or requesting a user PIN.

At step 303, the account holder responds to the issuer's request by, for example, answering the identity question or entering the user PIN.

At step 304, it is determined whether the issuer's authentication challenge has been correctly answered. In the case that PIN numbers were used, the issuer can simply confirm that the PINs match. If the request is not satisfied, e.g., PINs do not match, the issuer may prompt the account holder with another request. If the account holder fails to satisfy the request after a predetermined number of tries, the account holder is barred from completing that financial transaction.

If the issuer's request is satisfied, the issuer then generates a surrogate account number in step 305. The surrogate account number can be sent to the mobile communication device of the account holder in numeric format (numeric sequence) or in the form of an electronic image of a bar code.

If the surrogate account number is sent in numeric format, it can be converted into a bar code by an application or applet that has been pre-installed or downloaded onto the account holder's mobile communication device. A method by which the application or applet can be downloaded onto the account holder's mobile communication device is explained above and with respect to FIG. 2. The surrogate account number can also be sent using SMS.

If the surrogate account number is sent in image format, e.g., as a bar code image, an application or applet that can read the electronic image may be required on the account holder's mobile communication device. Such an application can be downloaded, in accordance with methods already described herein.

In the alternative, the surrogate account number can be encrypted as any other type of machine-readable image, and is not necessarily limited to a bar code.

Preferably, the surrogate account number is unique to the particular transaction. For example, adding an expiry date and time can make each surrogate account number unique.

Bar codes can be displayed in the mobile communication device and read by a POS device in any manner known in the art. For example, a system, method and apparatus for communication of information encoded in a bar code format between a mobile communications device and a bar code scanner are disclosed in U.S. Pat. No. 6,685,093, which is hereby incorporated by reference.

The bar code can then be read from the face of the mobile communication device by a merchant's POS device, such as a bar code reader, in step 307. Once the sequence is read by POS device by methods known in the art, the POS device can request authorization to the issuer. This can be in the form of an ISO-8583 authorization request. Since the surrogate account number was generated by the issuer, the issuer can verify quickly that the requested transaction is legitimate, by matching the number sequence submitted by POS device with the issued surrogate number. The transaction can then be processed in accordance with conventional infrastructure and technology in step 308.

In the event that the account holder wishes to make an online transaction, the bar code can also be provided with a numeric sequence corresponding to the bar code that can be read by the user and entered into the appropriate field in step 307. A user completing an online transaction could, in the alternative, use a personal bar code reader. The transaction can then be accordance with conventional infrastructure and technology in step 308.

Once a financial transaction has been completed using the surrogate account number, the information contained in the bar code can expire and will no longer be valid for use in future transactions. The bar code can also expire after a predetermined amount of time if a financial transaction is not completed within a predetermined amount of time. Preferably, the predetermined amount of time is five minutes.

Figure 5:
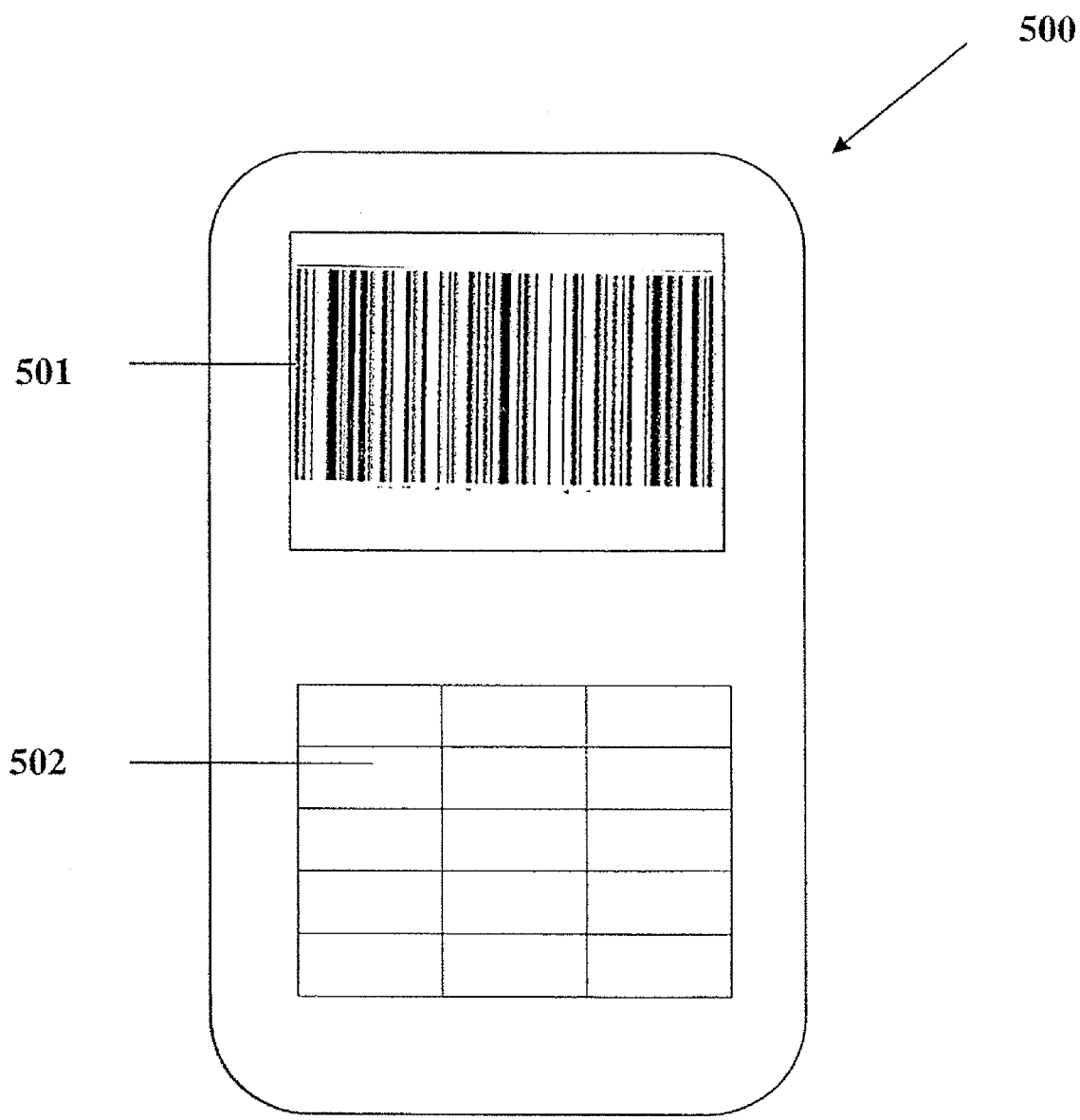
FIG. 5 shows an example of a mobile communications device implementing an aspect of the present invention.

An example of how a barcode may appear is shown in FIG. 5. Mobile communications device 500 has a screen 501 on which a barcode may appear. In this embodiment, only the barcode is shown, but it should be understood that the numeric sequence associated with the barcode can appear on the screen as well. Mobile communications device 500 is also provided with an interface 502 having any combination of numbers, letters and symbols to allow a user to enter information into the device to be stored in the mobile communications device and/or to be communicated wirelessly, for example, by SMS.

IV. Exemplary Implementation(s)

The present invention (i.e., wireless barcode financial transaction system 100, application installation system 200, or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 4:
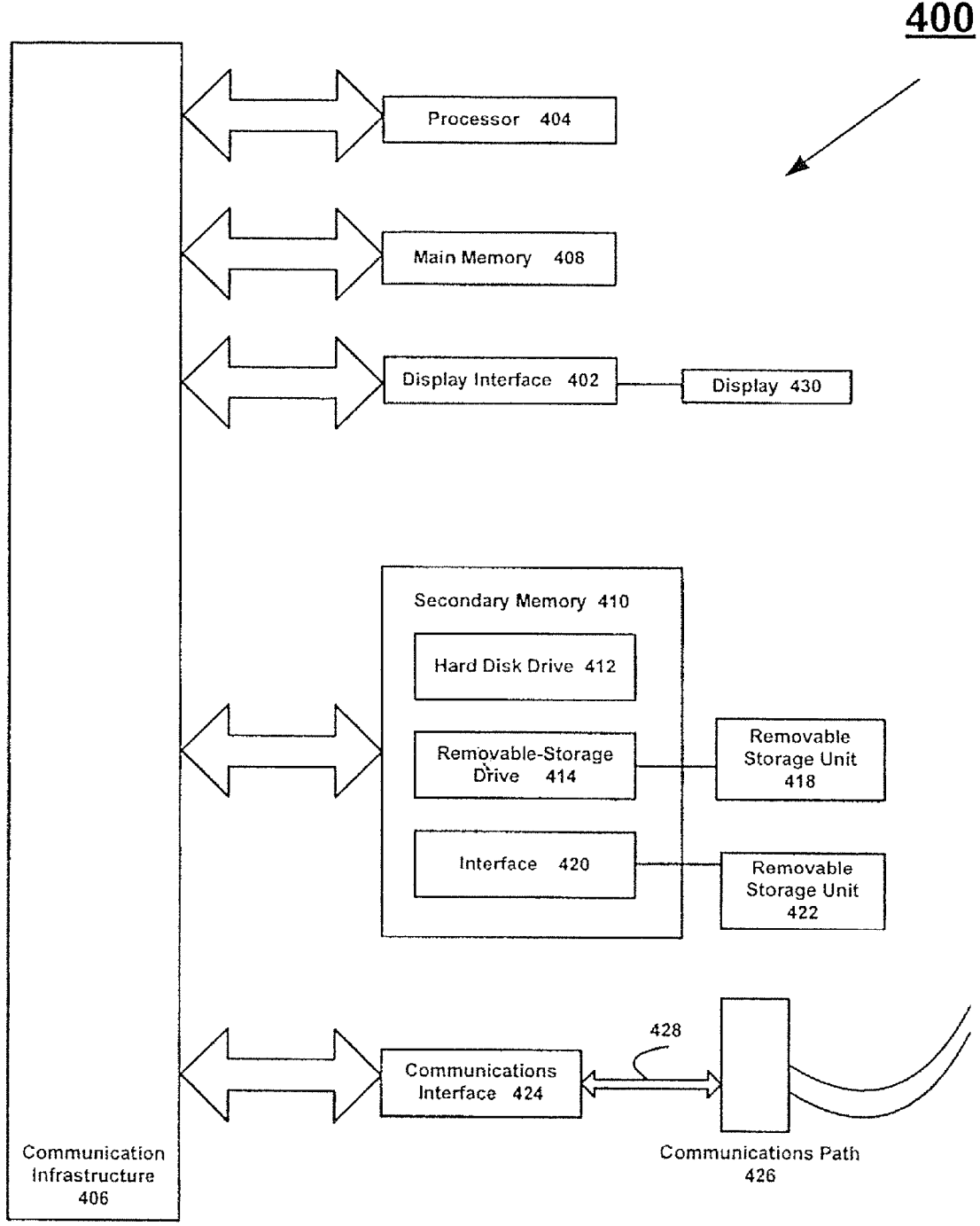
FIG. 4 shows a block diagram of an exemplary computer system useful for implementing an aspect of the present invention.

In an embodiment of the present invention, one or more computer systems are equipped to carry out the functions described herein. An example of such a computer system 400 is shown in FIG. 4.

Computer system 400 includes at least one processor 404. Processor 404 is connected to a communication infrastructure 406 (e.g., a communications bus, a cross-over bar device, or a network). Although various software embodiments are described herein in terms of this exemplary computer system 400, after reading this description, it will become apparent to a person skilled in the relevant art(s) how to implement the invention using other computer systems and/or architectures.

Computer system 400 includes a display interface 402 that forwards graphics, text, and other data from communication infrastructure 406 (or from a frame buffer (not shown)) for display on a display unit 430.

Computer system 400 also includes a main memory 408, which preferably is a random access memory (RAM), and may also include a secondary memory 410. Secondary memory 410 may include, for example, a hard disk drive 412 and/or a removable-storage drive 414 (e.g., a floppy disk drive, a magnetic tape drive, an optical disk drive, and the like). Removable-storage drive 414 reads from and/or writes to a removable storage unit 418 in a well-known manner. Removable storage unit 418 may be, for example, a floppy disk, a magnetic tape, an optical disk, and the like, which is written to and read by removable-storage drive 414. As will be appreciated, removable storage unit 418 includes a computer-usable storage medium having stored therein computer software and/or data.

In alternative embodiments, secondary memory 410 may include other similar devices for allowing computer programs or other instructions to be loaded into computer system 400. Such devices may include a removable storage unit 422 and an interface 420 (e.g., a program cartridge and a cartridge interface similar to those used with video game systems), a removable memory chip (e.g., an erasable programmable read-only memory ("EPROM"), or a programmable read-only memory ("PROM")) and an associated memory socket, and other removable storage units 422 and interfaces 420 that allow software and data to be transferred from removable storage unit 422 to computer system 400.

Computer system 400 may also include a communications interface 424, which allows software and data to be transferred between computer system 400 and external devices (not shown). Examples of communications interface 424 may include a modem, a network interface (e.g., an Ethernet card), a communications port, a Personal Computer Memory Card International Association ("PCMCIA") interface, and the like. Software and data transferred via communications interface 424 are in the form of signals 428, which may be electronic, electromagnetic, optical or another type of signal that is capable of being received by communications interface 424. Signals 428 are provided to communications interface 424 via a communications path 426 (e.g., a channel). Communications path 426 carries signals 428 and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 418 used with removable-storage drive 414, a hard disk installed in hard disk drive 412, and signals 428, for example. These computer program products provide software to computer system 400. The present invention may be implemented or embodied as one or more of such computer program products.

Computer programs (also referred to as computer control logic) are stored in main memory 408 and/or secondary memory 410. The computer programs may also be received via communications interface 424. Such computer programs, when executed, enable computer system 400 to perform the features of the present invention, as discussed herein. In particular, the computer programs, when executed, enable the processor 404 to perform the features of the present invention. Accordingly, such computer programs represent controllers of computer system 400.

In an embodiment where the present invention is implemented using software, the software may be stored in a computer program product and loaded into computer system 400 using removable-storage drive 414, hard drive 412, or communications interface 424. The control logic (software), when executed by processor 404, causes processor 404 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

As will be appreciated by those of skill in the relevant art(s), the present invention may be implemented using a single computer or using a computer system that includes multiple computers each programmed with control logic to perform various of the above-described functions of the present invention.

V. Conclusion

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A non-transitory, tangible computer-readable medium ("CRM") having computer-executable instructions stored thereon that, when executed by a computer for mobile transactions, cause the computer to perform operations comprising:
   receiving a purchase request transmitted from a mobile communication device associated with a buyer;
   in response to the purchase request, requesting information relating to an identity of the buyer;
   receiving a response to the requesting the information;
   determining that the information and the response match; and
   electronically sending to the mobile device a surrogate financial account number to enable the buyer to complete a transaction, wherein the surrogate financial account number is encoded in a bar code, and wherein the surrogate financial account number is associated with a financial transaction account of the buyer, and wherein the transaction is associated with the purchase request, wherein the bar code is electronically read from the mobile communication device by a bar code scanner to process the transaction, wherein processing the transaction results in the financial transaction account of the buyer being charged, and wherein the instructions cause the computer to perform operations further comprising converting the surrogate financial account number into bar code format and into the bar code.

2. The CRM of claim 1, wherein the purchase request is transmitted from the mobile communication device using short message service (SMS).

3. The CRM of claim 1, wherein the purchase request is transmitted by an application stored in the mobile communication device.

4. The CRM of claim 1, wherein the surrogate financial account number is sent using SMS.

5. The computer system of claim 1, wherein the purchase request is transmitted by an application stored in the mobile communication device.

6. A computer system for enabling completion of mobile transactions using a mobile communication device of a buyer comprising: a network interface communicating with a memory; the memory communicating with a processor; and the processor, when executing a computer program for enabling the mobile transactions, is configured to:
   receive a purchase request transmitted from the mobile communication device of the buyer;
   in response to receiving the purchase request, requesting information relating to an identity of the buyer;
   receive a response associated with the requesting the information;
   determine that the information and the response match; and
   electronically send to the mobile device a surrogate financial account number to enable the buyer to complete one of the transactions, wherein the surrogate financial account number is encoded in a bar code, wherein the surrogate financial account number is associated with a financial transaction account number of the buyer, wherein the one of the transactions is associated with the purchase request, wherein the bar code is electronically read from the mobile communication device by a bar code scanner to process the one of the transactions, and wherein processing the transaction results in the transaction financial account of the buyer being charged, and perform operations further comprising converting the surrogate financial account number into bar code format and into the bar code.

7. The computer system of claim 6, wherein the purchase request is transmitted from the mobile communication device using SMS.

8. The computer system of claim 6, wherein the surrogate account number is sent using SMS.

9. A computer-based method for enabling a mobile transaction comprising:
   receiving, by a financial transaction account issuer computer, a purchase request transmitted from the mobile communication device of the buyer;
   requesting, by the computer and in response to receiving the purchase request, information relating to an identity of the buyer;
   receiving, by the computer, a response associated with the requesting the information;
   determining, by the computer, that the information and the response match; and
   electronically sending, by the computer to the mobile communication device a surrogate financial account number to enable the buyer to complete a transaction, wherein the surrogate financial account number is encoded into a machine-readable bar code, and wherein the surrogate financial account number is associated with a financial transaction account of the buyer, wherein the surrogate financial account number is associated with a financial transaction account number of the buyer, wherein the transaction is associated with the purchase request, wherein the bar code is read from the mobile communication device by a bar code scanner to process the transaction, wherein processing the financial transaction results in the financial transaction account of the buyer being charged and wherein the surrogate financial account number is converted into bar code format and into the bar code.

10. The method of claim 9, wherein the purchase request is sent using SMS.

11. The method according to claim 9, wherein the requesting information comprises requesting using SMS.

12. The method according to claim 3, wherein the response is sent using SMS.

13. A method for completing a mobile transaction, the method comprising:
   sending, by a mobile communication device, a transaction authorization request to an issuer;
   electronically receiving, by the mobile communication device, an authentication message from the issuer;
   sending, by the mobile communication device and to the issuer, a response to the authentication message;
   receiving, by the mobile communication device and from the issuer, an SMS containing a surrogate financial account number to enable the buyer to complete the transaction, wherein the surrogate financial account number is associated with a financial transaction account number of the buyer, and wherein the transaction is associated with the transaction authorization request; and
   converting the surrogate financial account number into barcode format and into a machine readable bar code, and wherein the bar code is read from the mobile communication device by a bar code scanner to process the transaction, and wherein processing the financial transaction results in the financial transaction account of the buyer being charged.

14. The method of claim 13, wherein the transaction authorization request is sent using SMS.

15. The method of claim 13, wherein the authentication message is sent using SMS.

16. The method of claim 13, wherein the response to the authentication message is sent using SMS.

* * * * *

UNITED STATES PATENT AND TRADEMARK OFFICE
CERTIFICATE OF CORRECTION

| | |
|---|---|
| PATENT NO. | : 7,909,243 B2 |
| APPLICATION NO. | : 11/862686 |
| DATED | : March 22, 2011 |
| INVENTOR(S) | : Mark Merkow et al. |

It is certified that error appears in the above-identified patent and that said Letters Patent is hereby corrected as shown below:

In Column 13, Line 14, please delete "3" and insert therefor --9--.

Signed and Sealed this
Twenty-fourth Day of May, 2011

David J. Kappos
*Director of the United States Patent and Trademark Office*